(12) United States Patent
Lai

(10) Patent No.: US 10,282,298 B2
(45) Date of Patent: May 7, 2019

(54) STORE BUFFER SUPPORTING DIRECT STORES TO A COHERENCE POINT

(71) Applicant: Microsoft Technology Licensing, LLC, Redmond, WA (US)

(72) Inventor: Patrick P. Lai, Fremont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/621,759

(22) Filed: Jun. 13, 2017

(65) Prior Publication Data

US 2018/0357172 A1  Dec. 13, 2018

(51) Int. Cl.
G06F 12/08 (2016.01)
G06F 12/0831 (2016.01)
G06F 12/0811 (2016.01)
G06F 12/0815 (2016.01)

(52) U.S. Cl.
CPC ...... *G06F 12/0833* (2013.01); *G06F 12/0811* (2013.01); *G06F 12/0815* (2013.01)

(58) Field of Classification Search
None
See application file for complete search history.

(56) References Cited

U.S. PATENT DOCUMENTS

| | | | |
|---|---|---|---|
| 5,530,933 A | 6/1996 | Frink et al. | |
| 6,622,214 B1 | 9/2003 | Vogt et al. | |
| 7,263,586 B1 | 8/2007 | Kapil | |
| 7,321,964 B2 | 1/2008 | Filippo et al. | |
| 7,516,310 B2 | 4/2009 | Altman et al. | |
| 7,921,253 B2 | 4/2011 | Saripalli | |
| 8,185,700 B2 | 5/2012 | Gimeno et al. | |
| 8,230,422 B2 | 7/2012 | Bohrer et al. | |
| 8,560,803 B2 | 10/2013 | Orf et al. | |
| 8,677,081 B1 | 3/2014 | Wentzlaff et al. | |
| 8,738,860 B1 | 5/2014 | Griffin et al. | |
| 8,868,833 B1 | 10/2014 | Bennett et al. | |
| 9,009,541 B2 | 4/2015 | Gulati et al. | |

(Continued)

FOREIGN PATENT DOCUMENTS

WO  2013081580 A1  6/2013

OTHER PUBLICATIONS

Garzaran, et al., "Tradeoffs in Buffering Speculative Memory State for Thread-Level Speculation in Multiprocessors", In Journal of ACM Transactions on Architecture and Code Optimization, vol. 2, Issue 3, Sep. 2005, pp. 247-279.

(Continued)

*Primary Examiner* — Kevin Verbrugge
(74) *Attorney, Agent, or Firm* — Alleman Hall Creasman & Tuttle LLP

(57) ABSTRACT

A system that uses a write-invalidate protocol has two types of stores: a traditional store that operates using a write-back policy that snoops for copies of the cache line at lower cache levels, and a store that writes, using a coherent write-through policy, directly to the last-level cache without snooping the lower cache levels. A separate store buffer may be maintained in the processor for the coherent write-through operations. A special bit may be maintained in the entries of a store buffer that is used for both traditional write-back policy stores and for coherent write-through policy. This bit indicates that loads and stores older than the last speculative store in the store buffer are allowed to be performed.

20 Claims, 6 Drawing Sheets

(56) References Cited

U.S. PATENT DOCUMENTS

| | | |
|---|---|---|
| 9,448,937 B1 | 9/2016 | Ahmad |
| 2002/0199063 A1 | 12/2002 | Chaudhry et al. |
| 2004/0059872 A1 | 3/2004 | Genduso et al. |
| 2005/0154805 A1 | 7/2005 | Steely, Jr. et al. |
| 2007/0022253 A1 | 1/2007 | Cypher et al. |
| 2007/0180197 A1 | 8/2007 | Wright et al. |
| 2007/0186053 A1 | 8/2007 | Chaudhry et al. |
| 2009/0193197 A1 | 7/2009 | Stevens et al. |
| 2009/0204769 A1 | 8/2009 | Heil et al. |
| 2009/0327616 A1 | 12/2009 | Conway et al. |
| 2010/0191920 A1 | 7/2010 | Fang et al. |
| 2011/0320727 A1 | 12/2011 | Orf et al. |
| 2012/0179876 A1 | 7/2012 | Guthrie et al. |
| 2013/0268735 A1 | 10/2013 | Gibert codina et al. |
| 2014/0089600 A1 | 3/2014 | Biswas et al. |
| 2014/0189411 A1 | 7/2014 | Kanchana et al. |
| 2014/0281197 A1 | 9/2014 | Niell et al. |
| 2014/0281274 A1 | 9/2014 | Pokam et al. |
| 2015/0026404 A1 | 1/2015 | Lilly et al. |
| 2015/0089154 A1 | 3/2015 | Busaba et al. |
| 2015/0149722 A1 | 5/2015 | Kannan et al. |
| 2015/0220440 A1 | 8/2015 | Aga et al. |
| 2015/0347297 A1 | 12/2015 | Hagersten et al. |
| 2015/0378731 A1 | 12/2015 | Lai et al. |
| 2016/0092223 A1 | 3/2016 | Wang et al. |
| 2016/0092360 A1 | 3/2016 | Moll |
| 2016/0328322 A1 | 11/2016 | Biswas et al. |
| 2016/0378659 A1 | 12/2016 | Gschwind et al. |
| 2017/0010656 A1 | 1/2017 | Ananthakrishnan et al. |
| 2018/0004660 A1 | 1/2018 | Lai et al. |

OTHER PUBLICATIONS

"Cache Coherency Primer", Retrieved from: https://fgiesen.wordpress.com/2014/07/07/cache-coherency/, Jul. 7, 2014, 11 Pages.

"Final Office Action Issued in U.S. Appl. No. 15/199,699", dated Sep. 19, 2018, 27 Pages.

"Non Final Office Action Issued in U.S. Appl. No. 15/199,699", dated Mar. 8, 2018, 31 Pages.

"Non Final Office Action Issued in U.S. Appl. No. 15/621,870", dated Aug. 28, 2018, 14 Pages.

Bell, Gordon, "Latency—and Error-Tolerant Redundant Execution", Thesis Submitted in the Doctoral Dissertation in University of Wisconsin-Madison, 2007, 176 Pages.

Kim, et al., "An efficient software shared virtual memory for the single-chip cloud computer", In Proceedings of the Second Asia-Pacific Workshop on Systems, Jul. 11, 2011, 5 Pages.

Kuperstein, et al., "Partial-Coherence Abstractions for Relaxed Memory Models", In Proceedings of the 32nd ACM SIGPLAN Conference on Programming Language Design and Implementation, Jun. 4, 2011, 12 Pages.

"International Search Report Issued in PCT Patent Application No. PCT/US2018/034029", dated Aug. 20, 2018, 11 Pages.

STORE BUFFER SUPPORTING DIRECT STORES TO A COHERENCE POINT

BACKGROUND

Integrated circuits, and systems-on-a-chip (SoC) may include two or more independent processing units (a.k.a., "cores") that read and execute instructions. These multi-core processing chips may cooperate to implement multiprocessing. The designers of these chips may select various techniques to couple the cores in a device so that they may share instructions and/or data.

SUMMARY

Examples discussed herein relate to an integrated circuit that includes a plurality of processor cores and a memory order buffer. The plurality of processor cores share a common last-level cache. The plurality the plurality of processor cores include a first processor core. The first processor core includes a store buffer to hold, prior to a corresponding store transaction being issued by the first processor core, data blocks to be written to memory. The store buffer includes, for each of the data blocks to be written to memory, a respective indicator that at least in part determines whether a respective data block is allowed to be modified prior to the first processor core issuing a store transaction to store the respective data block. The memory order buffer receives a first store transaction directed to storing a first data block in the last-level cache. The memory order buffer determines whether the first store transaction conflicts with a second store transaction.

In another example, a method of operating a processing system includes receiving, at a store buffer, data blocks to be written to memory. The method also includes holding, by the store buffer and prior to a corresponding store transaction being issued by the store buffer, the data blocks to be written to memory. The store buffer includes, for each of the data blocks to be written to memory, a respective indicator that at least in part determines whether a respective data block is allowed to be modified prior to the store buffer issuing a store transaction to store the respective data block. The method also includes issuing, by the store buffer and to a common last-level cache, at least a first store transaction to store a first data block. The method also includes determining, by the common last-level cache, whether the first store transaction conflicts with a second store transaction that has been received by the common last-level cache.

In another example, an integrated circuit includes a plurality of processor cores that share a common last-level cache and a memory order buffer. A first processor core is one of the plurality of processor cores. The first processor core includes a first store buffer for coherent store transactions and a second store buffer for non-coherent transactions. The memory order buffer receives store transactions sent to the last-level cache by the first store buffer. The first store buffer issues, to the memory order buffer, a first store transaction to store a first data block. The memory order buffer to determines the first store transaction conflicts with at least a second store transaction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or an integrated circuit.

In a system that uses a write-invalidate protocol, writes to a line that resides in the last-level cache (e.g., the level 3 cache in a system with three levels of cache) invalidates other copies of that cache line at the other cache levels. For example, a write to a line residing in the level 3 (L3) cache invalidates other copies of that cache line that are residing in the L1 and/or L2 caches of the cores and/or core clusters (aside from the copy already on a cache within the requesting core). This makes stores to cache lines that are shared with lower cache levels both time consuming and resource expensive since messages need to be sent to (e.g., snoop transactions), and received from (e.g., snoop responses), each of the caches at each of the cache levels.

In an embodiment, there are two types of stores: a traditional store that operates using a write-back policy that snoops for copies of the cache line at lower cache levels, and a store that writes, using a coherent write-through policy, directly to the last-level cache without snooping the lower cache levels. In a first embodiment, a separate store buffer is maintained in the processor for the coherent write-through operations. In a second embodiment, a special bit is maintained in the entries of a store buffer that is used for both traditional write-back policy stores and for coherent write-through policy. This bit indicates that loads and stores older than the last speculative store in the store buffer are allowed to be performed.

As used herein, the term "processor" includes digital logic that executes operational instructions to perform a sequence of tasks. The instructions can be stored in firmware or software, and can represent anywhere from a very limited to a very general instruction set. A processor can be one of several "cores" that are collocated on a common die or integrated circuit (IC) with other processors. In a multiple processor ("multi-processor") system, individual processors can be the same as or different than other processors, with potentially different performance characteristics (e.g., operating speed, heat dissipation, cache sizes, pin assignments, functional capabilities, and so forth). A set of "asymmetric" processors refers to a set of two or more processors, where at least two processors in the set have different performance capabilities (or benchmark data). As used in the claims below, and in the other parts of this disclosure, the terms "processor" and "processor core" will generally be used interchangeably.

Figure 1A:
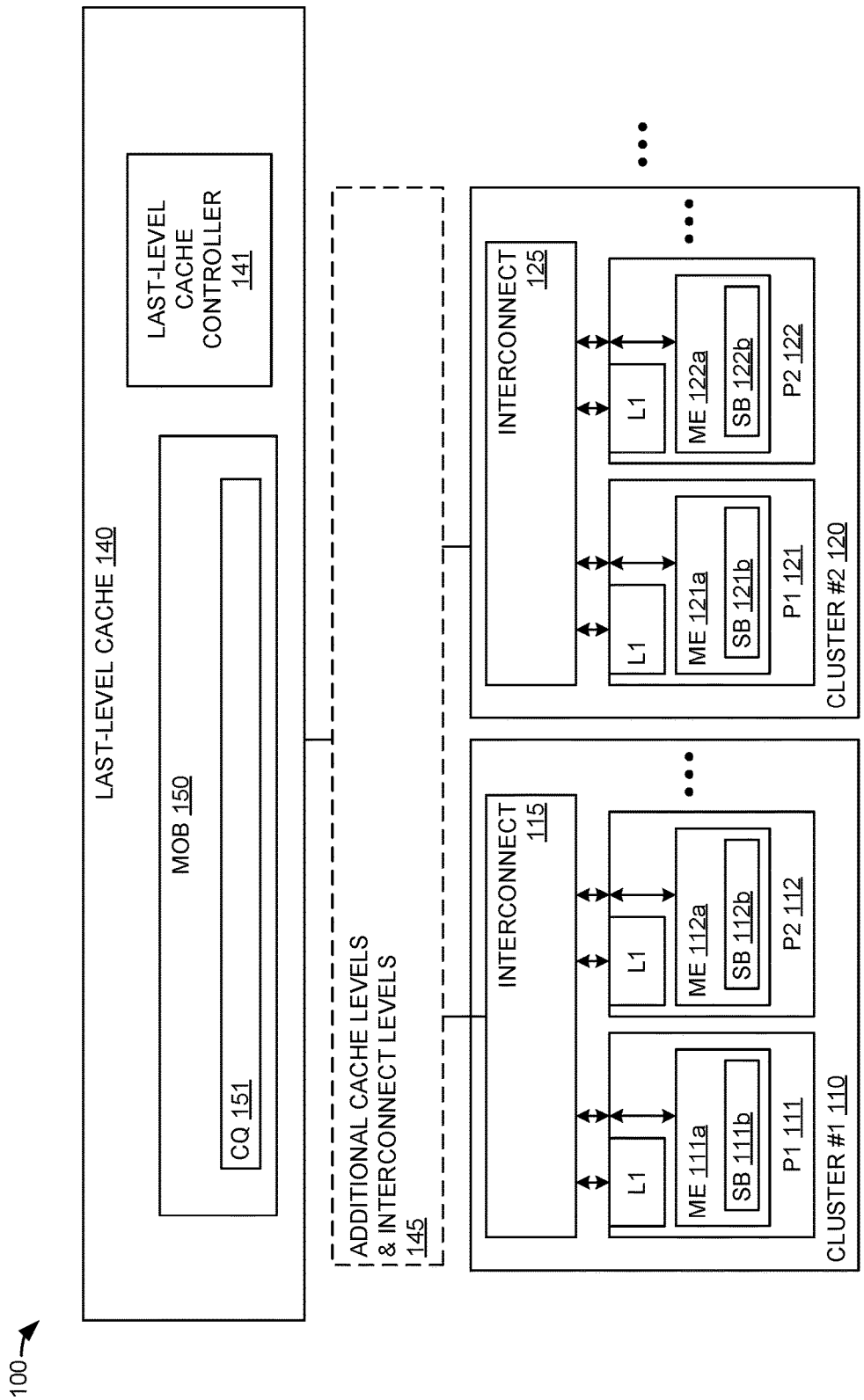
FIG. 1A is a block diagram illustrating a processing system.

FIG. 1A is a block diagram illustrating a processing system. In FIG. 1, processing system 100 includes processing cluster 110, processing cluster 120, additional cache levels and/or interconnect levels (cache/interconnect) 145, and last-level cache 140. Processing cluster #1 110 includes processor P1 111, processor P2 112, and interconnect 115. Processing cluster 110 may include additional processors (not shown in FIG. 1). Processing cluster #2 120 includes processor P1 121, processor P2 121, and interconnect 125. Processing cluster 120 may include additional processors (not shown in FIG. 1). Each of processors 111, 112, 121, and 122 include (at least) level 1 (L1) caches. Last-level cache 140 includes last-level cache controller 141 and memory order buffer (MOB) 150. Processing system 100 may include additional processing clusters comprised of additional processors and cache(s) (not shown in FIG. 1.)

Processor 111 also includes memory execution unit (ME) 111a. Memory execution unit 111a includes store buffer 111b. Processor 112 also includes memory execution unit 112a. Memory execution unit 112a includes store buffer 112b. Processor 121 also includes memory execution unit 121a. Memory execution unit 121a includes store buffer 121b. Processor 122 also includes memory execution unit 122a. Memory execution unit 122a includes store buffer 122b.

Processor 111 is operatively coupled to interconnect 115 of cluster 110. Processor 111 is operatively coupled to interconnect 115 of cluster 110. The L1 cache of processor 111 and the memory execution unit 111a of processor 111 are also operatively coupled to interconnect 115. Processor 112 is operatively coupled to interconnect 115. The L1 cache of processor 112 and the memory execution unit 112a of processor 112 is also operatively coupled to interconnect 115. Additional processors in cluster 110 (not shown in FIG. 1) may also be operatively coupled to interconnect 115 of cluster 110.

Processor 121 is operatively coupled to interconnect 125 of cluster 120. Processor 121 is operatively coupled to interconnect 125 of cluster 120. The L1 cache of processor 121 and the memory execution unit 121a of processor 121 is also operatively coupled to interconnect 125. Processor 122 is operatively coupled to interconnect 125. The L1 cache of processor 122 and the memory execution unit 122a of processor 122 is also operatively coupled to interconnect 125. Additional processors in cluster 120 (not shown in FIG. 1) may also be operatively coupled to interconnect 125 of cluster 120.

Cache/interconnect 145 is operatively coupled to cluster 110 via interconnect 115. Cache/interconnect 145 is operatively coupled to cluster 120 via interconnect 125. Cache/interconnect 145 is operatively coupled to last-level cache 140. Thus, the data associated with memory operations (e.g., loads, stores, etc.) originating from processor 111 and processor 112 may be exchanged with last-level cache 140, and memory order buffer 150 in particular, via interconnect 115 and cache/interconnect 145. Likewise, the data associated with memory operations originating from processor 121 and processor 122 may be exchanged with last-level cache 140, and memory order buffer 150 in particular, via interconnect 125 and cache/interconnect 145. Therefore, it should be understood that cluster 110 and cluster 120 (and thus processors 111, 112, 121, and 122) share last-level cache 140.

In an embodiment, MOB 150 receives store transactions from processors 111, 112, 121, and 122. Some of these store transactions may be indicated (e.g., by the contents of the transaction itself, or some other technique) to be written directly to last-level cache 140. In this case, processing system 100 (and last-level cache 140, in particular) does not query (i.e., 'snoop') the lower level caches (e.g., the L1 caches of any of processors 111, 112, 121, or 122) to determine whether any of these lower level caches has a copy of the affected cache line.

Other of these store transactions may be indicated to be processed by lower-level caches. In this case, processing system 100 (and last-level cache 140, in particular) queries the lower level caches of processors 111, 112, 121, and 122, and the caches (if any) of cache/interconnect 145.

In an embodiment, the store transactions may be indicated to be written directly to last-level cache 140 based on the type of store instruction that is being executed. In other words, the program running on a processor 111, 112, 121, or 122 may elect to have a particular store operation go directly to last-level cache 140 by using a first type of store instruction that indicates the store data is to go directly to cache 140. This first instruction type indicates to the processor 111, 112, 121, or 122 execution pipeline that the store is a speculative, resolve-the-ordering-at-coherence-point type of store. Thus, when this first instruction type arrives at a memory execution unit (e.g., memory execution units 111a, 112a, 121a, or 122a), the store buffer (e.g., store buffers 111b, 112b, 121b, or 122b) within the memory execution unit is able to identify them differently from instructions that are to be processed (e.g., be cached) by lower level caches. These first instruction types may be identified, for example, by using a special instruction encoding or a special bit signaling this is a speculative store instruction. Likewise, the program running on a processor 111, 112, 121, or 122 may elect to have a particular store operation be processed (e.g., be cached) by lower level caches by using a second type of store instruction that indicates the store data may be processed by the lower level caches.

In an embodiment, the store transactions are be indicated to be written directly to last-level cache 140 based on the addresses targeted by these store transactions being within a configured addressed range. In other words, all store operations that are addressed to a configured address range are sent by processing system 100 directly to last-level cache 140. All loads and stores to this configured address range are speculative stores that are issued directly to the coherence point—last-level cache 140—and have their memory ordering resolved there. Likewise, store operations that are addressed to a different address range may be processed by the lower level caches. One or both of these address ranges may be configured, for example, by values stored in memory and/or registers in processing system 100 (and processors 111, 112, 121, and 122, in particular.) These registers and/or memory values may be writable by one or more of processors 111, 112, 121, and 122.

In an embodiment, the address ranges that determines whether a store operation will be sent directly to last-level cache 140 can correspond to one or more physical or virtual memory pages. In this case, a page-table entry may store one or more indicators that determine whether stores directed to the corresponding memory page are to be sent directly to last-level cache 140.

Thus, it should be understood that processing system 100 implements a way of storing data into cache memory that can be used for frequently shared data. For the frequently shared data, the store operation associated with this data is indicated to be stored through direct to the coherence point (which is located at last-level cache 140.) This technique helps significantly reducing snoops caused by subsequent readers of the cache line. This technique also allows store-to-load forwarding by MOB 150 since all cache line access to the relevant physical address are mapped to the same coherence point on systems that distribute physical address space among multiple last-level cache 140 slices. It should be understood that the coherence point in a memory hierarchy where cache coherence is enforced. In processing system 100, the cache coherence point is at the last-level cache.

MOB 150, which resides at last-level cache 140 slices performs store-to-load forwarding. MOB 150 may also enforce write ordering in a manner consistent with the Instruction Set Architecture (ISA) of one or more of processors 111, 112, 121, and 122.

In an embodiment, a sequence of transactions sent between a processor 111, 112, 121, or 122 and the coherence point in last-level cache 140 is as follows:

First, a "speculative store with data" transaction is sent directly by memory execution unit 111a, 112a, 121a, or 122a to the coherent point in last-level cache 140. This message includes the store data.

After the "speculative store with data" transaction is received by last-level cache 140, and and is appropriately executed (i.e., either stored in a buffer, in a cache, or in memory), last-level cache 140 sends a "store is committed" message back to the requesting processor 111, 112, 121, or 122. The requesting processor 111, 112, 121, or 122, upon receiving this message, then regards this particular store instruction as properly executed. The requesting processor 111, 112, 121, or 122 then retires this store instruction from the corresponding store buffer 111b, 112b, 121b, or 122b. If there is store-to-load forwarding functionality in the requesting processor 111, 112, 121, or 122, the store data already forwarded to any load instruction in flight would be considered safe, and all such load instructions can be committed as well.

To help implement this protocol, store buffers 111b, 112b, 121b, and 122b maintain, for each entry, a "line ownership" bit for the speculative stores. This bit has a first (default) value until the corresponding speculative store is issued and a response indicating that the "store is committed" is received. In response to the "store is committed" message, the "line ownership" bit is changed to a second value.

This "line ownership", once changed to the second value, allows a processor 111, 112, 121, or 122 to assume it has the right to keep modifying this line without having to another requesting processor 111, 112, 121, or 122 modifying it. This is very efficient in a the single-writer, single-reader scenario. If last-level cache 140 receives and processes another store to the same line (e.g., by a non-owning processor 111, 112, 121, and 122), last-level cache 140 sends a "line disowned" message. When the "line disowned" message is received, store buffers 111b, 112b, 121b, and 122b change the "line ownership" bit to the first value. This indicates that the line in the store buffer may not be correct. Store-to-load forwarding cases are considered valid as long as the "line ownership" bit has the second value.

In an embodiment, when a first type of store instruction that indicates the store data is to go directly to cache 140 is received by a store buffer 111b, 112b, 121b, or 122b, the corresponding memory execution unit 111a, 112a, 121a, or 122a identifies it and issues a "speculative store with data" transaction directly to last-level cache 140. If last-level cache 140 (and MOB 150, in particular) determines that there are no conflicting stores to the same cache line being processed by memory order buffer 150, the speculative store is a success. Last-level cache controller 141 then returns a "store is committed" message back to requesting processor 111, 112, 121, or 122. In response, the corresponding speculative store buffer 111b, 112b, 121b, or 122b commits and retires the first type of store instruction.

If last-level cache 140 (and MOB 150, in particular) determines that there is at least one conflicting store to the same cache line being processed by memory order buffer 150, and at least one of the stores to the same cache line cannot be successful in storing its value to the cache line, the speculative store instruction would fail to enact the store to the destination cache line. In this case, memory order buffer 150 buffers the conflicting speculative stores in conflict queue 151 and a "line disowned" message is sent to the requesting processor 111, 112, 121, or 122. The requesting processor 111, 112, 121, or 122, in response to the "line disowned" message, sets the "line ownership" bit for the corresponding cache line to the second value. As a result, previous store-to-load forwarding bypasses from the corresponding cache line are considered invalid. Because these store-to-load forwarding bypasses are considered invalid, the corresponding load instructions are also invalidated and reissued at a later time.

Conflict queue 151 processes the conflicting writes to the same cache line. Conflict queue 151 processes the conflicting writes to resolve memory ordering and conflicts. The corresponding speculative store buffer 111b, 112b, 121b, or 122b waits for memory order buffer 150 to resolve the conflicting writes to the same cache line. Once the conflicts have been resolved, memory order buffer 150 sends a 'line is committed' message (along with the cache line data) to all of the requesting processors 111, 112, 121, or 122 that are/were involved in the conflict. This allows the requesting processors 111, 112, 121, or 122 to use the updated cache line to resolve the invalided store-to-load forward bypasses.

Note that the 'line disowned' message can also act as a flow control function. For example, conflict queue 151 is limited in size for each cache line. Once the conflict queue entry for a cache line is full, processors 111, 112, 121, or 122 should be stopped from issuing stores to the same line because that would overflow the conflict queue 151 entry for that cache line. The 'line disowned' message stops further store requests to the conflicted cache line by processors 111, 112, 121, or 122 until the conflicts are resolved—thereby preventing an overflow of the conflict queue 151 entry.

In an embodiment, speculative store buffers 111b, 112b, 121b, and 122b (e.g., which are for buffering speculative, resolve-the-ordering-at-coherence-point types of stores) are in addition to a 'regular' store buffer that is used to buffer store instructions that may be processed by the lower level caches. Given all loads and stores to the configured address range are speculative stores that are issued directly to the coherence point, speculative stores can only modify the content of a unique memory range. Thus, there is no ordering requirement between the memory location a speculative store instruction modifies and the locations other store instructions issued from the regular store buffer modify. However, memory accesses to the configured address range and memory accesses to the "regular" memory region may have a data or control dependency from each other as defined in the relative program order of two such instructions. In this case, the two store buffers (plus the load buffer) cooperate with each other so as not to violate the memory ordering as defined by the instruction set architecture.

In an embodiment, store buffers 111b, 112b, 121b, and 122b processes both the 'regular' and the direct to last-level cache 140 'speculative' stores. In this embodiment, store buffers 111b, 112b, 121b, and 122b include a 'speculative store' indicator (which is in addition to the 'line ownership' indicator.)

In an embodiment, processors 111, 112, 121, and 122 share last-level cache 140. Processors 111, 112, 121, and 122 include store buffers 111b, 112b, 121b, and 122b, respectively. A given store buffer (e.g., store buffer 111b) holds, prior to the processor core (e.g., processor core 111) issuing a corresponding store transaction, data blocks (a.k.a., cache lines) to be written to memory. For each of the data blocks to be written to memory, a respective indicator that at least in part determines whether a respective data block is allowed to be modified prior to processor core 111 issuing a store transaction to store the respective data block. Memory order buffer 150 receives at least a first store transaction to store a first data block in last-level cache 140. Memory order buffer 150 determines whether the first store transaction conflicts with a second store transaction.

Memory order buffer 150 may send an indicator of whether the first store transaction conflicts with the second store transaction to the first processor core. For example, memory order buffer 150 may send, to processor core 111 a 'line disowned' message. In another example, memory order buffer 150 may send, to processor core 111 a 'store is committed' message.

Based at least in part on the indicator of whether the first store transaction conflicts with the second store transaction, store buffers 111b may change the respective indicators that determine whether a respective data block is allowed to be modified prior to processor core 111 issuing a store transaction. Based at least in part on the indicator of whether the first store transaction conflicts with the second store transaction, processor core 111 may invalidate at least one store-to-load forward bypass of data associated with the first store transaction.

After memory order buffer 150 (and conflict queue 151, in particular) has resolved the conflict between the first store transaction and the second store transaction, memory order buffer 150 sends, to processor 111, an indicator that the conflict has been resolved. For example, memory order buffer 150 may send, to processor core 111 a 'store is committed' message (along with the deconflicted cache line data.) Based at least in part on the indicator that the conflict has been resolved, processor 111 performs at least one store-to-load forward of at least some data associated with the first store transaction. For example, after receiving the 'store is committed' message and the deconflicted cache line data, processor 111 may forward all or part of the deconflicted cache line data to another part of processor 111 in order to complete an executing instruction.

Based at least in part on a resource limitation, the memory order buffer may send an indicator that the first store transaction conflicts with the second store transaction to the first processor core. For example, once the conflict queue entry for a given cache line is full, memory order buffer 150 may send a 'line disowned' message to processor 111 in order to stop further store requests to a conflicted cache line.

In an embodiment, store buffer 111b receives data blocks to be written to memory. Store buffer 111b holds, prior to issuing a corresponding store transaction to last-level cache 140, the data blocks that are to be written. The entries in store buffer 111b that hold the data blocks include (or are associated with) an indicator that at least in part determines whether the data block in that entry is allowed to be modified by processor 111 prior to issuing the store transaction to last-level cache 140. Store buffer 111b issues, to last-level cache 140, at least a first store transaction to store a first data block. Last-level cache 140 (and memory order buffer 150, in particular) determines whether the first store transaction conflicts with a second store transaction that has already been received by last-level cache 140.

Based at least in part on the determination that the first store transaction conflicts with a second store transaction, last-level cache 140 may send, to store buffer 111b, an indicator that the first store transaction conflicts with at least the second store transaction. For example, last-level cache 140 may send, to processor 111 for delivery to store buffer 111b, a 'line disowned' message. Based at least in part on the indicator that the first store transaction conflicts with at least the second store transaction, store buffer 111b may change the indicator that at least in part determines whether the first data block is allowed to be modified. For example, based on receiving the 'line disowned' message, store buffer 111b may change the state of the 'line ownership' associated with the 'line disowned' cache line.

Based at least in part on the indicator that the first store transaction conflicts with at least the second store transaction, at least one store-to-load forward bypass of at least part of the first data block may be invalidated. For example, based on receiving the 'line disowned' message, processor 111 may invalidate and previous store-to-load forwarding bypasses from the 'line disowned' cache line.

Based at least in part on common last-level cache 140 determining that the first store transaction no longer conflicts with a second store transaction, last-level cache 140 may send, to store buffer 111b, an indicator that the first store transaction no longer conflicts with another store transaction. For example, once last-level cache 140 (and memory order buffer 150 and conflict queue 151, in particular) has resolved the store conflicts associated with a cache line, last-level cache 140 may send a 'line is committed' message (along with the deconflicted/resolved cache line data) to processor 111.

Based on the indicator that the first store transaction no longer conflicts with another store transaction, at least one store-to-load forward bypass of at least part of the first data block is performed by processor 111. For example, based on receiving the 'line is committed' message, store buffer 111b may forward at least part of the deconflicted cache line to another part of processor 111. Based at least in part on the determination that the first store transaction conflicts with the second store transaction, and determining that a threshold condition related to a resource for resolving conflicts between store transactions has been met, last-level cache may send, to processor 111 for forwarding to store buffer 111b, the indicator that the first store transaction conflicts with at least the second store transaction. For example, based on an entry in conflict queue 151 reaching a capacity threshold (e.g., a maximum number of conflicting stores), last-level cache 140 may send a 'line disowned' to processor 111 in order to stop processor 111 from issuing more stores to the 'line disowned' cache line.

In an embodiment, processor 111 may include a first store buffer 111*b* for direct to last-level cache 140 store transactions and a second store buffer (not shown in FIGS. 1A-1B) for transaction that are to be processed by at least one lower level cache (e.g., L1 of processor 111.) Last-level cache 140 may also include memory order buffer 150 to detect and resolve conflicts between at least a first store transaction and a second store transaction.

Figure 1B:
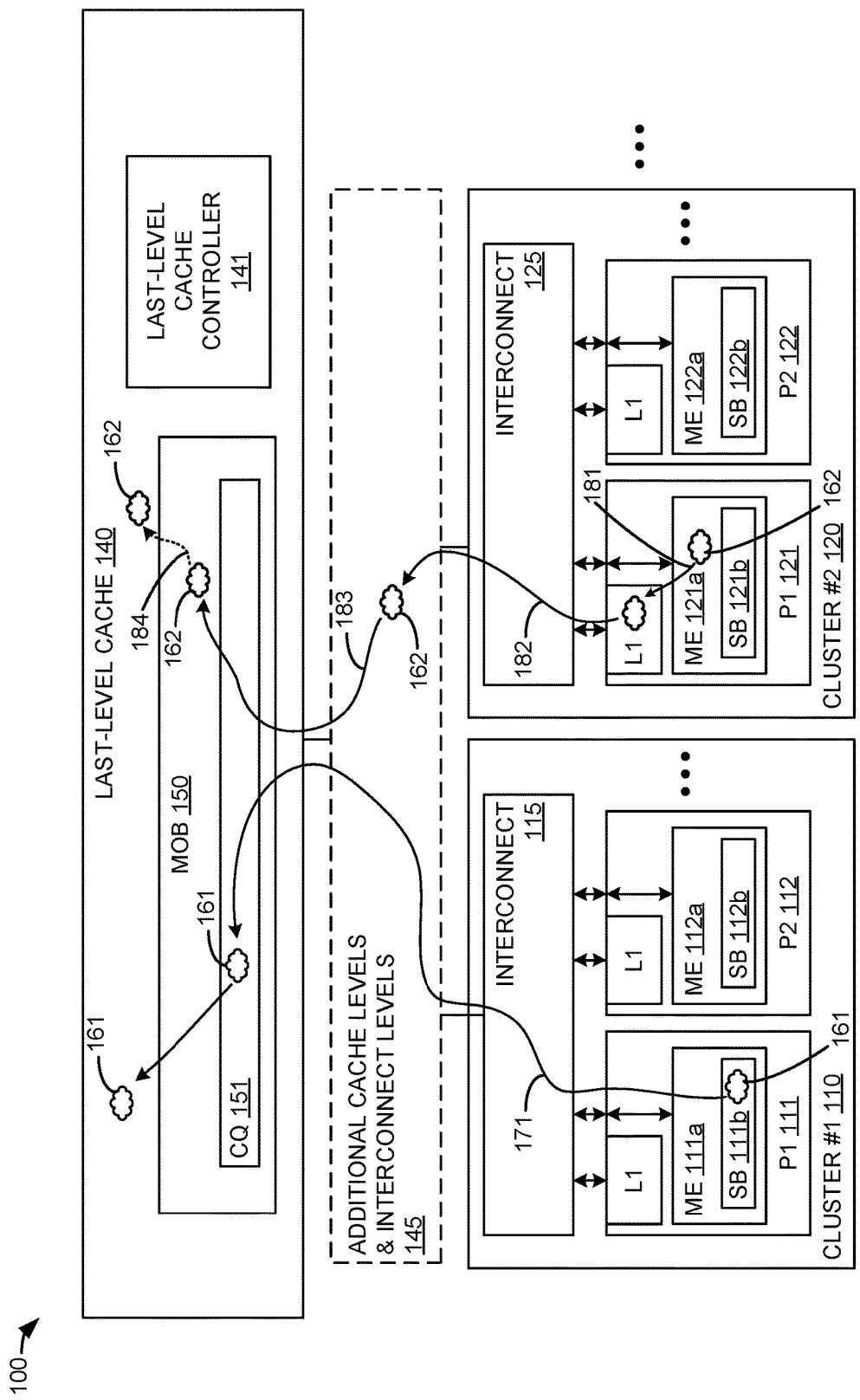
FIG. 1B is a diagram illustrating the flow of data to a last-level cache.

FIG. 1B is a diagram illustrating the flow of data to a last-level cache. In FIG. 1B, processing system 100 is illustrated with store data 161 and store data 162. Store data 161 starts out being stored in store buffer 111B and is sent directly to MOB 150. In the case of a conflict, store data 161 may be processed by conflict queue 151. This is illustrated by arrow 171 flowing from processor 111, through interconnect 115, through cache/interconnect 145 (but not any caches in cache/interconnect 145), to conflict queue 151. After resolving any conflicts, data 161 is stored in last-level cache 150. This is illustrated by the arrow flowing from conflict queue 151 to the main portion of last-level cache 140.

Store data 162 is processed by lower level caches before being sent to last-level cache 150. This is illustrated by arrow 181 flowing from memory execution unit 121*a* to the L1 cache of processor 121. From the L1 cache of processor 121, data 162 is then sent to cache/interconnect 145. This is illustrated by arrow 182 flowing from the L1 cache of processor 121 through interconnect 125 to cache/interconnect 145. From cache/interconnect 145, data 162 is sent to MOB 150. This is illustrated by arrow 183 flowing from cache/interconnect 145 to MOB 150. After arriving at MOB 150, data 162 is stored in last-level cache 150. This is illustrated by arrow 184 flowing from MOB 150 to the main portion of last-level cache 140.

Figure 2:
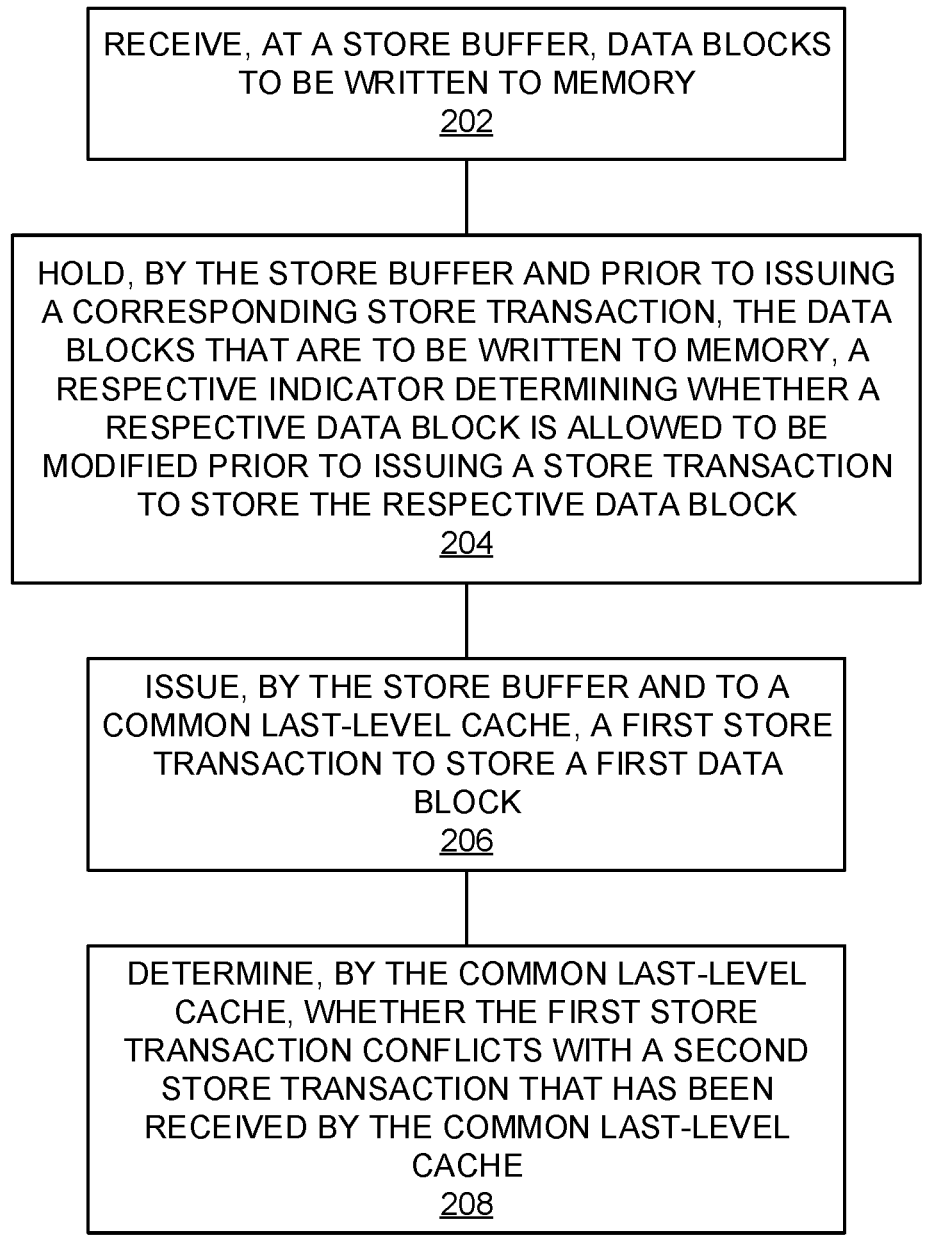
FIG. 2 is a flowchart of a method of operating a processing system.

FIG. 2 is a flowchart of a method of operating a processing system. The steps illustrated in FIG. 2 may be performed by one or more elements of system 100 and/or its components. At a store buffer, data blocks to be written to memory are received (202). For example, store buffer 111*b* may receive from other parts of processor 111 data blocks that are to be written to memory. By the store buffer and prior to issuing a corresponding store transaction, the data blocks that are to be written to memory are held where the store buffer includes a respective indicator that determines whether a respective data block is allowed to be modified prior to issuing a store transaction to store the respective data block (204). For example, store buffer 111*b* may holds, prior to issuing a corresponding store transaction to last-level cache 140, data blocks that are to be written to last-level cache 140. The entries in store buffer 111*b* that hold the data blocks include (or are associated with) an indicator that at least in part determines whether the data block in that entry is allowed to be modified by processor 111 prior to issuing the store transaction to last-level cache 140.

By the store buffer and to a common last-level cache, a first store transaction to store a first data block is issued (206). For example, store buffer 111*b* may issue, to last-level cache 140, a first store transaction to store a first data block. By the common last level cache, it is determined whether the first store transaction conflicts with a second store transaction that has been received by the common last-level cache (208). For example, last-level cache 140 may determine whether the store transaction issued by store buffer 111*b* conflicts with another store transaction that was issued by a different store buffer 112*b*, 121*b*, or 122*b*.

Figure 3:
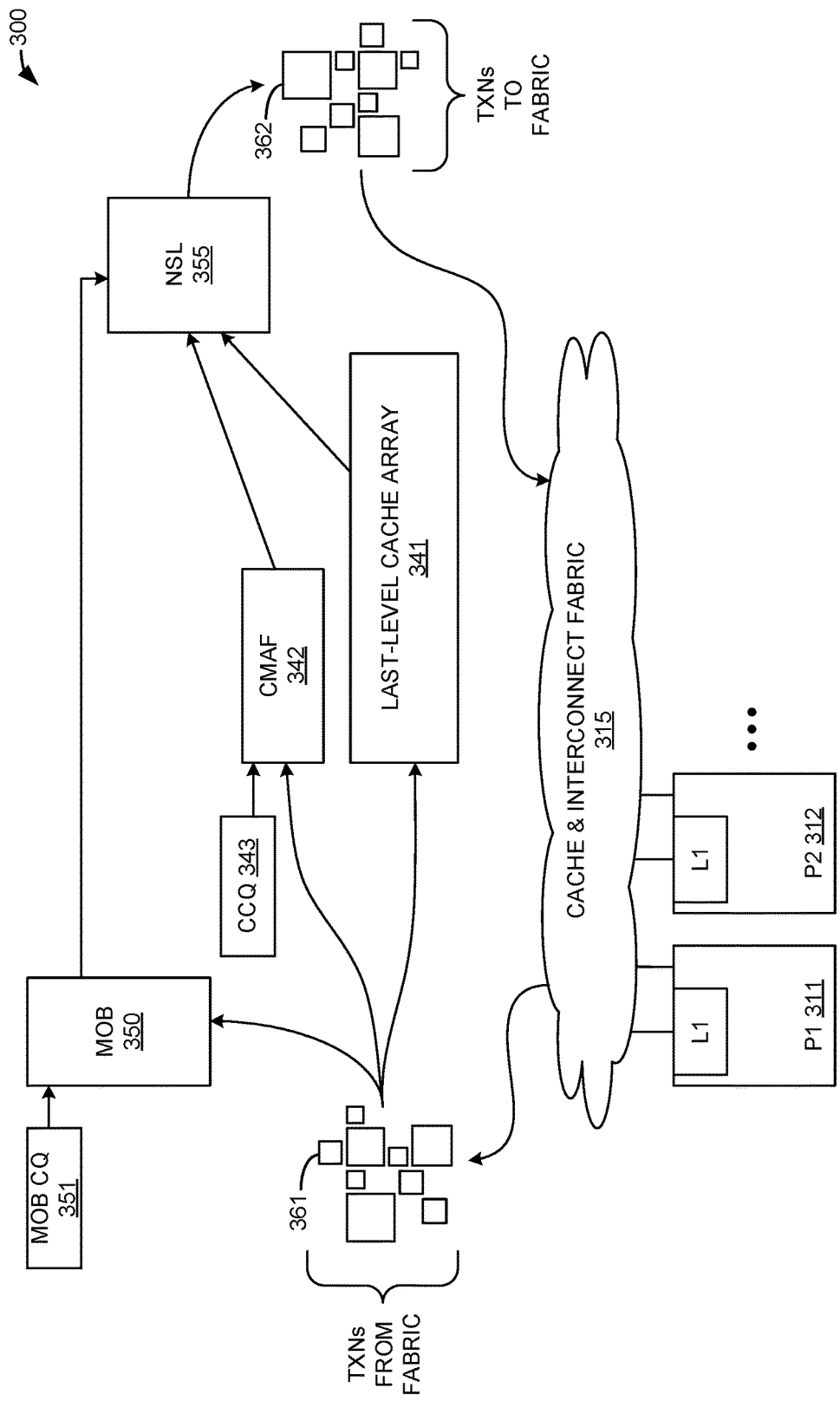
FIG. 3 is a diagram illustrating a last-level cache pipeline coupled to multiple processors.

FIG. 3 is a diagram illustrating a memory order buffer and last-level cache pipeline coupled to multiple processors. In FIG. 3, processing system 300 comprises processor 311, processor 312, cache and interconnect fabric 315, memory order buffer (MOB) 350, memory order buffer conflict queue (MOB CQ) 351, last-level cache array 341, cache miss address file (CMAF) 342, cache conflict queue (CCQ) 343, and next state logic (NSL) 355. Processor 311 includes a lower level cache L1. Processor 312 includes a lower level cache L1. Processors 311-312 correspond to, and are configured to operate, as described herein with respect to processors 111, 112, 121, and 122. Also illustrated in FIG. 3 are transactions 361 and transactions 362.

Processor 311 and processor 312 are operatively coupled to fabric 315. Fabric 315 provides transactions 361 to last-level cache 340. Last-level cache 340 provides transactions 362 to fabric 315. Fabric 315 may send transactions 362 (e.g., one or more transactions containing read data) to one or more of processors 311 and 312.

Transactions 361 originate from store buffers (e.g., store buffers 111*b*, 112*b*, 121*b*, and/or 122*b*) in one or more of processors 311 and 312. Transactions 361 may include store transactions that are sent directly from a processor 311 or 312 to MOB 350 without being processed by lower level caches (e.g., the L1 cache of processor 311 or the cache levels of fabric 315, if any). Transactions 361 may include store transactions that are sent from a lower level cache (e.g., the L1 cache of processor 311 or the cache levels of fabric 315, if any). Transactions 361 may include load transactions that are directed to access data recently sent to last-level cache 340.

Transactions 361 are distributed by processors 311-312 to MOB 350, CMAF 342, and cache array 341. MOB 350 holds coherent store transactions 361 until these store transactions are written to last-level cache array 341. A load transaction 361 that corresponds to a coherent store transaction in MOB 350 causes MOB 350 to provide the data from the store transaction directly to next state logic 355—thereby bypassing CMAF 342 and cache array 341. NSL 355 outputs transactions 362 to fabric 315. Thus, it should be understood that system 300 may implement store-to-load forwarding. The forwarded data may include data that was sent directly from a processor 311 or 312 to MOB 350 without being processed by lower level caches. The forwarded data may include data that was sent to last-level cache array 341 after being stored in one or more lower level caches (e.g., the L1 cache of processor 311 or the cache levels of fabric 315, if any). System 300 may also respond to "speculative store with data" transactions and send "store is committed" and "line disowned" transactions as described herein.

Figure 4:
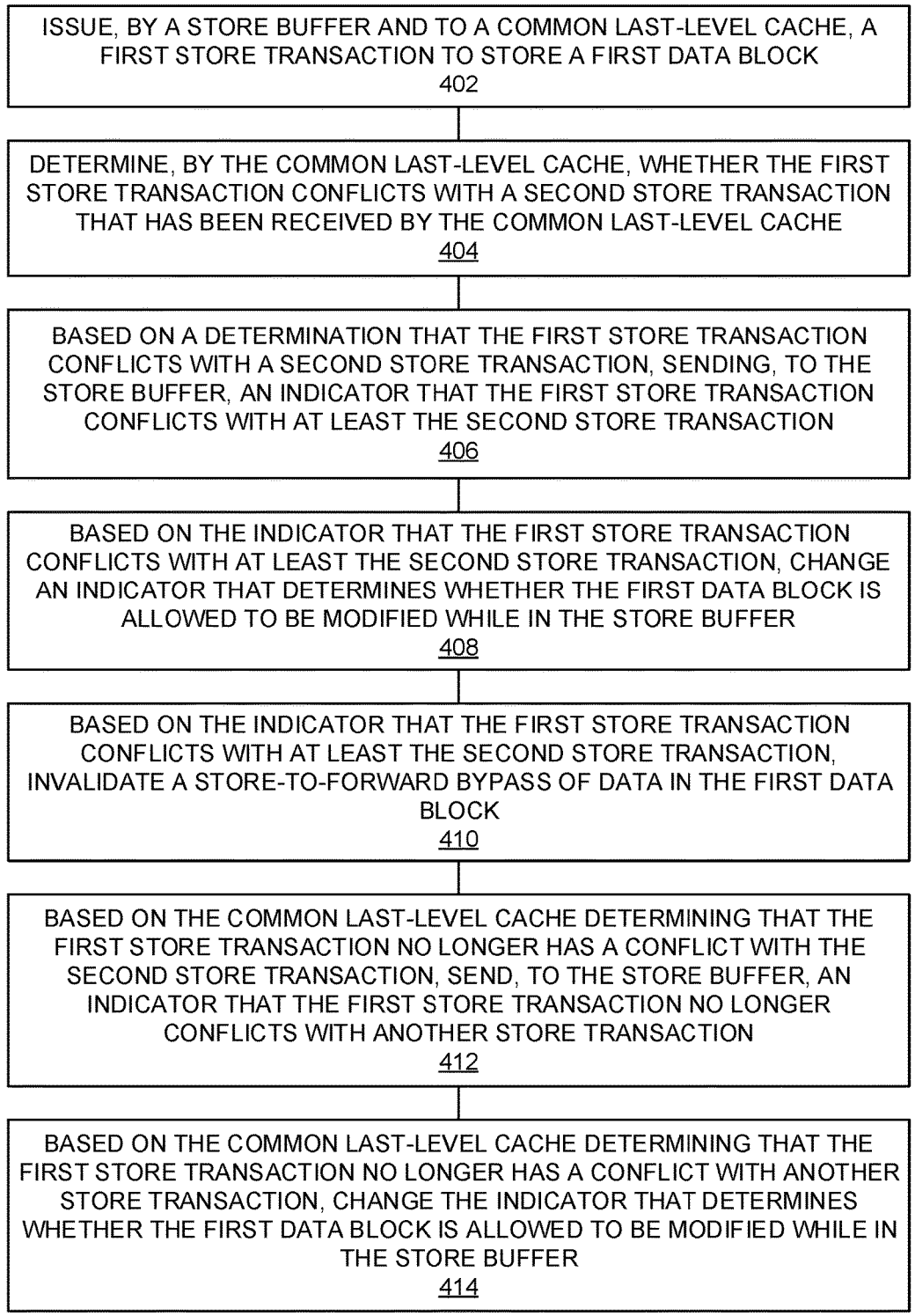
FIG. 4 is a flowchart of a method to resolve store conflicts.

FIG. 4 is a flowchart of a method to resolve store conflicts. The steps illustrated in FIG. 4 may be performed by one or more elements of system 100, system 300, and/or their components. By a store buffer and to a common last-level cache, a first store transaction to store a first data block is issued (402). For example, store buffer 111*b* may issue a "speculative store with data" transaction directly to last-level cache 140.

By the common last-level cache, it is determined whether the first store transaction conflicts with a second store transaction that has been received by the common last-level cache (404). For example, memory order buffer 150 of last-level cache 140 may determine whether a "speculative store with data" transaction received by last-level cache 140 conflicts with another "speculative store with data" transaction sent from a different store buffer (e.g., store buffer 112*b*, 121*b*, and/or 122*b*.)

Based on a determination that the first store transaction conflicts with a second store transaction, an indicator that the first store transaction conflicts with at least the second store transaction is sent to the store buffer (406). For example, if last-level cache 140 determines there is a conflict between two or more store transactions last-level cache 140 (and memory order buffer 150, in particular) is processing, last-level cache 140 may send, to processor 111 for delivery to store buffer 111*b*, a 'line disowned' message.

Based on the indicator that the first store transaction conflicts with at least the second store transaction, an indicator that determines whether the first data block is allowed to be modified while in the store buffer is changed (408). For example, based on receiving the 'line disowned' message, store buffer 111*b* may change the state of the 'line ownership' associated with the 'line disowned' cache line. Based on the indicator that the first store transaction conflicts with at least the second store transaction, a store-to-load forward bypass of data in the first data block is invalidated (410). For example, based on receiving the 'line disowned' message, processor 111 may invalidate and previous store-to-load forwarding bypasses from the 'line disowned' cache line.

Based on the common last-level cache determining that the first store transaction no longer has a conflict with the second store transaction, an indicator that the first store transaction no longer conflicts with another store transaction is sent to the store buffer (412). For example, once last-level cache 140 (and memory order buffer 150 and conflict queue 151, in particular) has resolved the store conflicts associated with a cache line, last-level cache 140 may send a 'line is committed' message (along with the deconflicted/resolved cache line data) to processor 111 for delivery to store buffer 111*b*.

Based on the common last-level cache determining that the first store transaction no longer has a conflict with another store transaction, the indicator that determines whether the first data block is allowed to be modified in the store buffer is changed (414). For example, based on receiving the 'line is committed' message, store buffer 111*b* may change the state of the 'line ownership' indicator corresponding to the 'committed' cache line.

The methods, systems and devices described herein may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 300, and/or their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

Figure 5:
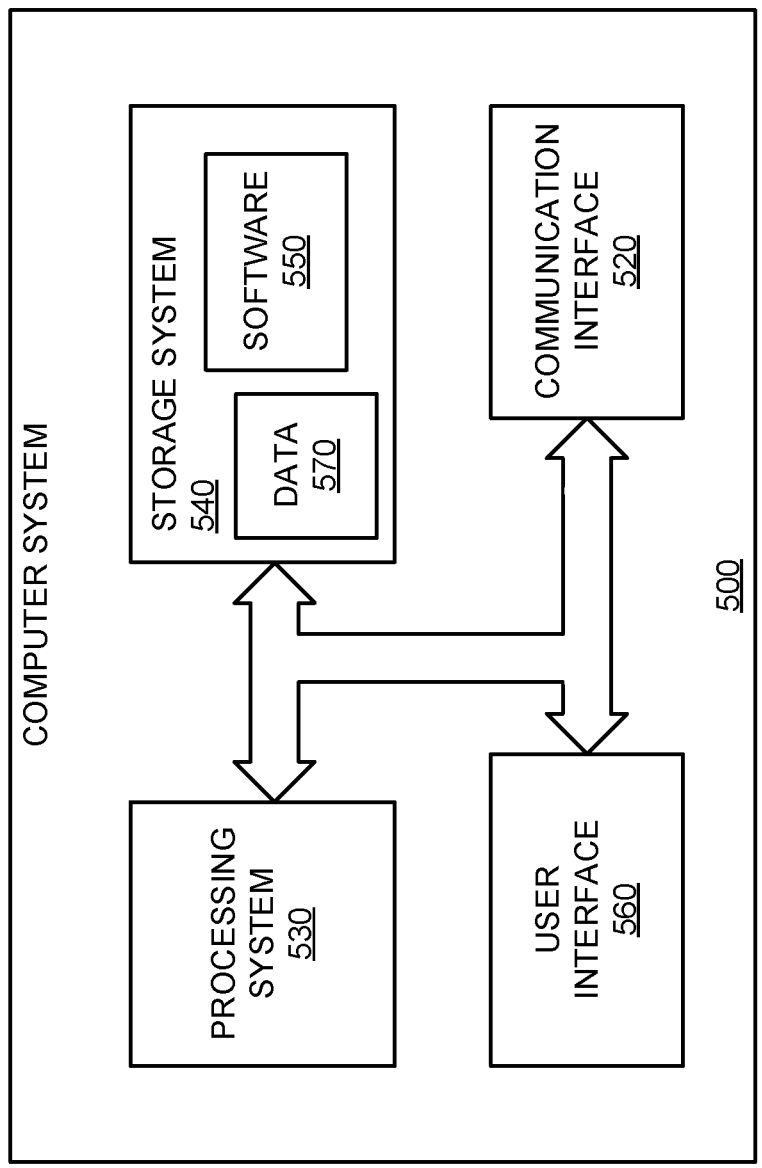
FIG. 5 is a block diagram of a computer system.

FIG. 5 illustrates a block diagram of an example computer system. In an embodiment, computer system 500 and/or its components include circuits, software, and/or data that implement, or are used to implement, the methods, systems and/or devices illustrated in the Figures, the corresponding discussions of the Figures, and/or are otherwise taught herein.

Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Processing system 530 may be an example of one or more of system 100, system 300, and/or their components.

Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, EEPROM, flash memory, network storage, server, or other memory function. Storage system 540 may include computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 550 may create or modify software 550 or data 570 to achieve a tangible result. Processing system may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

Implementations discussed herein include, but are not limited to, the following examples:

Example 1

An integrated circuit, comprising: a plurality of processor cores that share a common last-level cache, a first processor core being a one of the plurality of processor cores, the first processor core including a store buffer to hold, prior to a corresponding store transaction being issued by the first processor core, data blocks to be written to memory, the store buffer including, for each of the data blocks to be written to memory, a respective indicator that at least in part determines whether a respective data block is allowed to be modified prior to the first processor core issuing a store transaction to store the respective data block; and, a memory order buffer to receive a first store transaction to store a first data block in the last-level cache, the memory order buffer to determine whether the first store transaction conflicts with a second store transaction.

Example 2

The integrated circuit of example 1, wherein the memory order buffer is to send an indicator of whether the first store transaction conflicts with the second store transaction to the first processor core.

Example 3

The integrated circuit of example 2, wherein the store buffer changes the respective indicator based at least in part on the indicator of whether the first store transaction conflicts with the second store transaction.

Example 4

The integrated circuit of example 3, wherein, based at least in part on the indicator of whether the first store transaction conflicts with the second store transaction, the first processor core invalidates at least one store-to-load forward bypass of data associated with the first store transaction.

Example 5

The integrated circuit of example 4, wherein, after the memory order buffer has resolved a conflict between the first store transaction and the second store transaction, the memory order buffer sends an indicator that the conflict has been resolved to the first processor core.

Example 6

The integrated circuit of example 5, wherein, based at least in part on the indicator that the conflict has been resolved, the first processor core performs at least one store-to-load forward of at least some data associated with the first store transaction.

Example 7

The integrated circuit of example 2, wherein, based at least in part on a resource limitation, the memory order buffer sends an indicator that the first store transaction conflicts with the second store transaction to the first processor core.

Example 8

A method of operating a processing system, comprising: receiving, at a store buffer, data blocks to be written to memory; holding, by the store buffer and prior to a corresponding store transaction being issued by the store buffer, the data blocks to be written to memory, the store buffer including, for each of the data blocks to be written to memory, a respective indicator that at least in part determines whether a respective data block is allowed to be modified prior to the store buffer issuing a store transaction to store the respective data block; issuing, by the store buffer and to a common last-level cache, at least a first store transaction to store a first data block; and, determining, by the common last-level cache, whether the first store transaction conflicts with a second store transaction that has been received by the common last-level cache.

Example 9

The method of example 8, further comprising: based at least in part on the determination that the first store transaction conflicts with the second store transaction, sending, to the store buffer, an indicator that the first store transaction conflicts with at least the second store transaction.

Example 10

The method of example 9, further comprising: based at least in part on the indicator that the first store transaction conflicts with at least the second store transaction, changing the indicator that at least in part determines whether the first data block is allowed to be modified.

Example 11

The method of example 10, further comprising: based at least in part on the indicator that the first store transaction conflicts with at least the second store transaction, invalidating at least one store-to-load forward bypass of at least part of the first data block.

Example 12

The method of example 11, further comprising: based at least in part on the common last-level cache determining that the first store transaction no longer conflicts with a second store transaction, sending, to the store buffer, an indicator that the first store transaction no longer conflicts with another store transaction.

Example 13

The method of example 12, further comprising: based on the indicator that the first store transaction no longer conflicts with another store transaction, performing at least one store-to-load forward bypass of at least part of the first data block.

Example 14

The method of example 12, further comprising: based on the indicator that the first store transaction no longer conflicts with another store transaction, changing the indicator that at least in part determines whether the first data block is allowed to be modified.

Example 15

The method of example 12, further comprising: based at least in part on the determination that the first store transaction conflicts with the second store transaction, and determining that a threshold condition related to a resource for resolving conflicts between store transactions has been met, sending, to the store buffer, the indicator that the first store transaction conflicts with at least the second store transaction.

Example 16

An integrated circuit, comprising: a plurality of processor cores that share a common last-level cache, a first processor core being one of the plurality of processor cores, the first processor core including a first store buffer for direct to the last-level cache store transactions and a second store buffer for transactions that are to be processed by at least one lower level cache; and, a memory order buffer to receive store transactions sent to the last-level cache by the first store buffer, the first store buffer to issue, to the memory order buffer, a first store transaction to store a first data block, the memory order buffer to determine the first store transaction conflicts with at least a second store transaction.

Example 17

The integrated circuit of example 16, wherein the memory order buffer is to send an indicator that the first store transaction conflicts with at least the second store transaction to the first store buffer.

Example 18

The integrated circuit of example 17, wherein, based at least in part on the indicator that the first store transaction conflicts with at least the second store transaction, the store buffer prevents at least one store-to-load forward bypass of at least part of the first data block.

Example 19

The integrated circuit of example 18, wherein, based at least in part on a resource limitation, the memory order buffer is to send an indicator that the first store transaction conflicts with at least the second store transaction to the first store buffer.

Example 20

The integrated circuit of example 19, wherein, based at least in part on the common last-level cache determining that the first store transaction no longer conflicts with another store transaction, sending, to the first store buffer, an indicator that the first store transaction no longer conflicts with another store transaction.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. An integrated circuit, comprising:
a plurality of processor cores that share a common last-level cache, a first processor core being a one of the plurality of processor cores, the first processor core including a store buffer to hold, prior to a corresponding store transaction being issued by the first processor core, data blocks to be written to memory, the store buffer including, for each of the data blocks to be written to memory, a respective indicator that at least in part determines whether a respective data block is allowed to be modified prior to the first processor core issuing a store transaction to store the respective data block; and,
a memory order buffer to receive a first store transaction to store a first data block in the last-level cache, the memory order buffer to determine whether the first store transaction conflicts with a second store transaction.

2. The integrated circuit of claim 1, wherein the memory order buffer is to send an indicator of whether the first store transaction conflicts with the second store transaction to the first processor core.

3. The integrated circuit of claim 2, wherein the store buffer changes the respective indicator based at least in part on the indicator of whether the first store transaction conflicts with the second store transaction.

4. The integrated circuit of claim 3, wherein, based at least in part on the indicator of whether the first store transaction conflicts with the second store transaction, the first processor core invalidates at least one store-to-load forward bypass of data associated with the first store transaction.

5. The integrated circuit of claim 4, wherein, after the memory order buffer has resolved a conflict between the first store transaction and the second store transaction, the memory order buffer sends an indicator that the conflict has been resolved to the first processor core.

6. The integrated circuit of claim 5, wherein, based at least in part on the indicator that the conflict has been resolved, the first processor core performs at least one store-to-load forward of at least some data associated with the first store transaction.

7. The integrated circuit of claim 2, wherein, based at least in part on a resource limitation, the memory order buffer sends an indicator that the first store transaction conflicts with the second store transaction to the first processor core.

8. A method of operating a processing system, comprising:
receiving, at a store buffer, data blocks to be written to memory;
holding, by the store buffer and prior to a corresponding store transaction being issued by the store buffer, the data blocks to be written to memory, the store buffer including, for each of the data blocks to be written to memory, a respective indicator that at least in part determines whether a respective data block is allowed to be modified prior to the store buffer issuing a store transaction to store the respective data block;

issuing, by the store buffer and to a common last-level cache, at least a first store transaction to store a first data block; and, determining, by the common last-level cache, whether the first store transaction conflicts with a second store transaction that has been received by the common last-level cache.

9. The method of claim 8, further comprising:

based at least in part on the determination that the first store transaction conflicts with the second store transaction, sending, to the store buffer, an indicator that the first store transaction conflicts with at least the second store transaction.

10. The method of claim 9, further comprising:

based at least in part on the indicator that the first store transaction conflicts with at least the second store transaction, changing the indicator that at least in part determines whether the first data block is allowed to be modified.

11. The method of claim 10, further comprising:

based at least in part on the indicator that the first store transaction conflicts with at least the second store transaction, invalidating at least one store-to-load forward bypass of at least part of the first data block.

12. The method of claim 11, further comprising:

based at least in part on the common last-level cache determining that the first store transaction no longer conflicts with a second store transaction, sending, to the store buffer, an indicator that the first store transaction no longer conflicts with another store transaction.

13. The method of claim 12, further comprising:

based on the indicator that the first store transaction no longer conflicts with another store transaction, performing at least one store-to-load forward bypass of at least part of the first data block.

14. The method of claim 12, further comprising:

based on the indicator that the first store transaction no longer conflicts with another store transaction, changing the indicator that at least in part determines whether the first data block is allowed to be modified.

15. The method of claim 12, further comprising:

based at least in part on the determination that the first store transaction conflicts with the second store transaction, and determining that a threshold condition related to a resource for resolving conflicts between store transactions has been met, sending, to the store buffer, the indicator that the first store transaction conflicts with at least the second store transaction.

16. An integrated circuit, comprising:

a plurality of processor cores that share a common last-level cache, a first processor core being one of the plurality of processor cores, the first processor core including a first store buffer for direct to the last-level cache store transactions and a second store buffer for transactions that are to be processed by at least one lower level cache; and, a memory order buffer to receive store transactions sent to the last-level cache by the first store buffer, the first store buffer to issue, to the memory order buffer, a first store transaction to store a first data block, the memory order buffer to determine the first store transaction conflicts with at least a second store transaction.

17. The integrated circuit of claim 16, wherein the memory order buffer is to send an indicator that the first store transaction conflicts with at least the second store transaction to the first store buffer.

18. The integrated circuit of claim 17, wherein, based at least in part on the indicator that the first store transaction conflicts with at least the second store transaction, the store buffer prevents at least one store-to-load forward bypass of at least part of the first data block.

19. The integrated circuit of claim 18, wherein, based at least in part on a resource limitation, the memory order buffer is to send an indicator that the first store transaction conflicts with at least the second store transaction to the first store buffer.

20. The integrated circuit of claim 19, wherein, based at least in part on the common last-level cache determining that the first store transaction no longer conflicts with another store transaction, sending, to the first store buffer, an indicator that the first store transaction no longer conflicts with another store transaction.

* * * * *